(No Model.)
S. & M. FREEMAN.
BROADCAST SEED SOWER.
No. 321,706. Patented July 7, 1885.
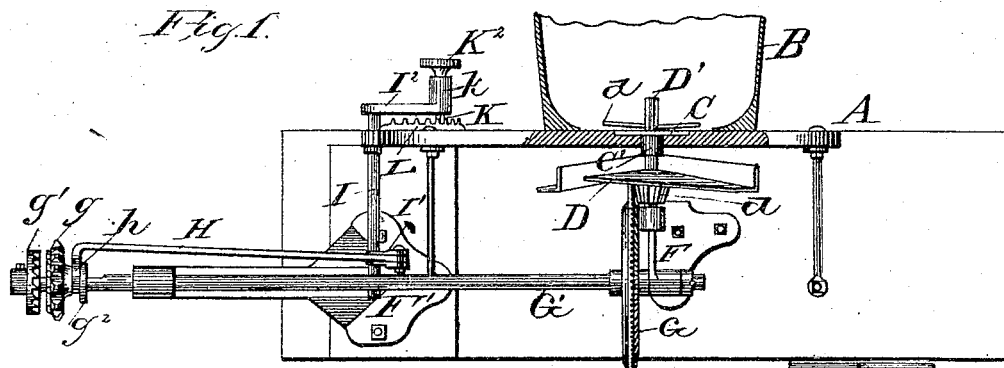
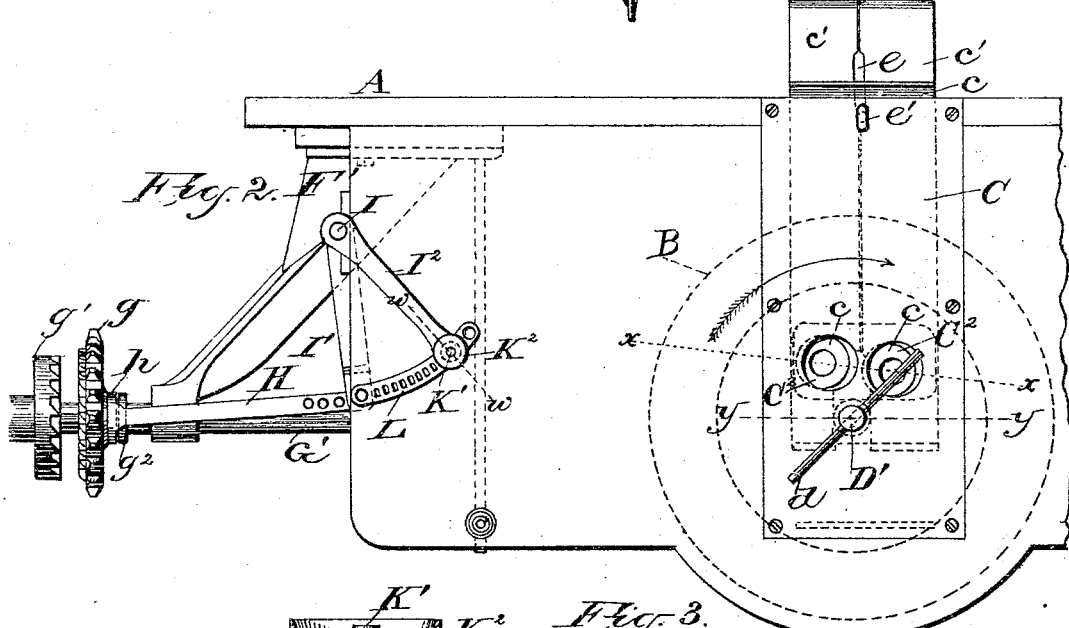
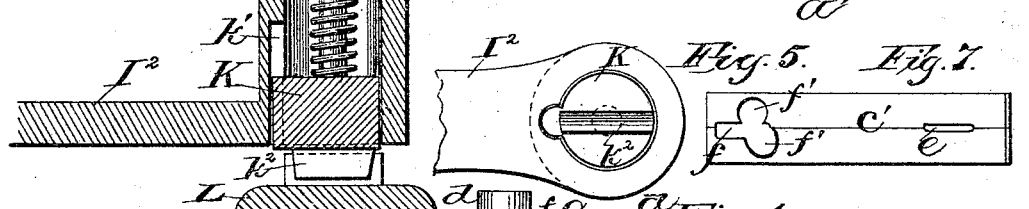
Witnesses:
E. G. Osmus
R. Platz
Inventors.
Stephen Freeman
Michael Freeman
By Stout & Underwood
Attorneys.

UNITED STATES PATENT OFFICE.

STEPHEN FREEMAN AND MICHAEL FREEMAN, OF RACINE, WISCONSIN.

BROADCAST SEED-SOWER.

SPECIFICATION forming part of Letters Patent No. 321,706, dated July 7, 1885.

Application filed February 25, 1885. (No model.)

*To all whom it may concern:*

Be it known that we, STEPHEN FREEMAN and MICHAEL FREEMAN, of Racine, in the county of Racine, and in the State of Wisconsin, have invented certain new and useful Improvements in Broadcast Seed-Sowers; and we do hereby declare that the following is a full, clear, and exact description thereof.

Our invention relates to seed-sowers, and will be fully described hereinafter.

In the drawings, Figure 1 is a rear view of our sower, with the hopper and floor partly in section. Fig. 2 is a plan view. Fig. 3 is a section on line X X, Fig. 2. Fig. 4 is a section on line W W, same figure. Figs. 5 and 7 are details; and Fig. 6 is a section on line Y Y, Fig. 2.

A is the frame of our improved sower, which consists of a horizontal board that forms the floor, and a vertical board by which the structure may be attached to the rear end of a vehicle.

B is the hopper. That part of the floor that forms the bottom of the hopper is recessed, as at $a$, and an opening, $a'$, extends down through this recess to permit the seed or fertilizer to fall onto the distributer D.

C is a casting of metal, that fits in a recess, $a$, and is held up from the bottom of the recess by its flanges $b$. The casting C has formed on it, near its inner end, a hollow stud, C', that projects down through an opening made for it in the floor of the machine, and this stud receives the distributer-shaft D'. The stirring-pin $d$ passes through this shaft and revolves with it. The central space between the casting C and the floor is occupied by the feed-regulating plates $c$ and $c'$. The plate $c'$ lies flat on the floor, and is divided longitudinally into two sections, as shown in Fig. 7, each of which may be moved in or out independently of the other. The adjacent edges of those sections are recessed near their outer ends to form a slot, $e$, for a pin, $e'$, that when in place prevents their entire withdrawal, and at their rear ends the sections are recessed, as at $f$, to accommodate the stud C', while both plates are also recessed, as at $f'$, to permit the fall of the seed or fertilizer through opening $a'$. The plate $c$ is preferably made thinner than plate $c'$, and of a single piece of metal, with holes down through it near its inner end that correspond with holes $C^2$ through the casting C, except that they are smaller, and this plate $c$ is adapted for being adjusted in the direction of its length to bring the holes in proper position with relation to the shaft, and may be locked, after being adjusted, by means of the pin $e'$. The casting C is rather thicker than the plate $c$, and the metal is beveled off of that side of each of the holes $C^2$ in the casting that the stirring-pin passes over last, for if these edges were vertical the seed or fertilizer falling in front of them would form a barrier that would resist the stirring-pin and choke or clog its action. With my device there is no resistance to the action of the stirring-pin, the beveled edges of the holes permitting that portion of the seed or fertilizer that does not fall through to pass freely in front of the stirring-pin. The lower end of shaft D' has its bearing in an arm of a bracket, F, and the hub of the distributer D carries or is formed with a bevel-pinion, $d$, on its under side, for engagement with bevel-teeth on the face of wheel G on the driving-shaft G', one end of which bears in the arm of bracket F and the other in the arm of a bracket, F'. The driving-shaft G' projects out beyond its bearing in the arm of bracket F' to take a sprocket-wheel, $g$, that fits loosely upon it, and a clutch-wheel, $g'$, that is fixed upon it and has teeth for engagement with teeth on the adjacent face of the sprocket-wheel, which latter has a grooved hub, $g^2$, to receive the fingers $h$ of a spanner-arm, H, that is pivoted at its other end to the lower arm, I', of a vertical rock-shaft, I, while the upper arm, $I^2$, of this rock-shaft projects out over the floor of the apparatus, and has a housing, $k$, on its outer end to receive a dog, K, and its pintle K', which latter extends up through the top of the housing to take a thumb-nut, $K^2$. A spring, $K^3$, is interposed between the dog K and the top of the housing, and the latter is grooved at $k'$ to take a rib on the dog K and hold the latter in such a position that its tooth $k^2$ will be parallel to the teeth on a quadrant, L, with which it engages to hold the machine in or out of gear. The dog K is disengaged from the teeth of the quadrant by lifting upon nut $K^2$.

Having fully described our invention, what we claim as new, and desire to secure by Letters Patent, is—

1. In a sower, a casting that forms a portion of the bottom of the hopper, having an opening for the exit of the seed or fertilizer, said opening having a beveled edge, in combination with a stirring-pin, substantially as and for the purpose set forth.

2. In a sower, the combination of the casting and its beveled openings with plate $c$ and its openings, and the stirring-pin, as set forth.

3. In a sower, the combination, with casting C, of plate $c'$, formed in two sections, capable of independent adjustment, as set forth.

4. In a sower, the driving-shaft carrying a fixed clutch-wheel and loose sprocket-wheel, in combination with a spanner-arm, shaft I, arm $I^2$, spring-dog K, its housing, and quadrant L, as set forth.

In testimony that we claim the foregoing we have hereunto set our hands, at Racine, in the county of Racine and State of Wisconsin, in the presence of two witnesses.

STEPHEN FREEMAN.
    MICHAEL FREEMAN.

Witnesses:
 S. S. STOUT,
 THOMAS J. GRIFFITHS.